(12) United States Patent
Hu et al.

(10) Patent No.: US 11,714,994 B2
(45) Date of Patent: Aug. 1, 2023

(54) LEARNING FROM DELAYED OUTCOMES USING NEURAL NETWORKS

(71) Applicant: DeepMind Technologies Limited, London (GB)

(72) Inventors: Huiyi Hu, San Francisco, CA (US); Ray Jiang, London (GB); Timothy Arthur Mann, Harpenden (GB); Sven Adrian Gowal, Cambridge (GB); Balaji Lakshminarayanan, London (GB); András György, London (GB)

(73) Assignee: DeepMind Technologies Limited, London (GB)

( * ) Notice: Subject to any disclaimer, the term of this patent is extended or adjusted under 35 U.S.C. 154(b) by 1160 days.

(21) Appl. No.: 16/298,448

(22) Filed: Mar. 11, 2019

(65) Prior Publication Data

US 2019/0279076 A1 Sep. 12, 2019

Related U.S. Application Data

(60) Provisional application No. 62/641,206, filed on Mar. 9, 2018.

(51) Int. Cl.
*G06N 3/04* (2006.01)
*G06N 3/08* (2006.01)

(52) U.S. Cl.
CPC ......... *G06N 3/0454* (2013.01); *G06N 3/0472* (2013.01); *G06N 3/08* (2013.01)

(58) Field of Classification Search
CPC ....... G06N 3/0454; G06N 3/0472; G06N 3/08
See application file for complete search history.

(56) References Cited

U.S. PATENT DOCUMENTS

| | | | |
|---|---|---|---|
| 10,963,819 B1* | 3/2021 | Gangadharaiah | G06F 40/56 |
| 2017/0178346 A1* | 6/2017 | Ferro | G06N 3/0445 |
| 2017/0270919 A1* | 9/2017 | Parthasarathi | G10L 17/18 |

(Continued)

OTHER PUBLICATIONS

Agarwal et al., "Distributed Delayed Stochastic Optimization," Advances in Neural Information Processing Systems (NIPS), Apr. 2011, 9 pages.

(Continued)

*Primary Examiner* — Oluwatosin O Alabi
(74) *Attorney, Agent, or Firm* — Fish & Richardson P.C.

(57) ABSTRACT

Methods, systems, and apparatus, including computer programs encoded on computer storage media, for learning from delayed outcomes using neural networks. One of the methods includes receiving an input observation; generating, from the input observation, an output label distribution over possible labels for the input observation at a final time, comprising: processing the input observation using a first neural network configured to process the input observation to generate a distribution over possible values for an intermediate indicator at a first time earlier than the final time; generating, from the distribution, an input value for the intermediate indicator; and processing the input value for the intermediate indicator using a second neural network configured to process the input value for the intermediate indicator to determine the output label distribution over possible values for the input observation at the final time; and providing an output derived from the output label distribution.

20 Claims, 5 Drawing Sheets

(56) References Cited

U.S. PATENT DOCUMENTS

2018/0032846 A1* 2/2018 Yang .................. G06N 3/04
2018/0144248 A1* 5/2018 Lu .................. G06K 9/6277

OTHER PUBLICATIONS

Cesa-Bianchi et al., "Nonstochastic Bandits with Composite Anonymous Feedback," Proceedings of the 31st Conference on Learning Theory, Proceedings of Machine Learning Research, 2018, 75:23 pages.

Chapelle, "Modeling delayed feedback in display advertising," Proceedings of the 20th ACM SIGKDD International Conference on Knowledge Discovery and Data Mining, KDD '14, Aug. 2014, 1097-1105.

Cheng et al., "Wide & Deep Learning for Recommender Systems," Proceedings of the 1st Workshop on Deep Learning for Recommender Systems, Sep. 2016, 4 pages.

Davidson et al., "The YouTube video recommendation system," Proceedings of the fourth ACM conference on Recommender systems, Sep. 2010, 293-296.

Fernández et al., "Gaussian Processes for Survival Analysis" https://arxiv.org/abs/1611.00817, Nov. 2016, 13 pages.

Hazan, "Introduction to Online Convex Optimization," Foundations and Trends in Optimization, Aug. 2016, 2(3-4): 157-325.

Joulani et al., "Online learning under delayed feedback," Proceedings of the 30th International Conference on Machine Learning, Feb. 2013, 9 pages.

Joulani et al., "Delay-Tolerant Online Convex Optimization: Unified Analysis and Adaptive-Gradient Algorithms," AAAI, Feb. 2016, 16:1744-1750.

Mesterharm, "On-line learning with delayed label feedback," International Conference on Algorithmic Learning Theory, Oct. 2005, 15 pages.

Quanrud et al., "Online Learning with Adversarial Delays," Advances in Neural Information Processing Systems 28, Dec. 2015, 9 pages.

Weinberger et al., "On delayed prediction of individual sequences," IEEE Transactions on Information Theoiy, Jul. 2002, 48(7):1959-1976.

Yu et al., "Learning Patient-Specific Cancer Survival Distributions as a Sequence of Dependent Regressors," Advances in Neural Information Processing Systems, Dec. 2011, 9 pages.

\* cited by examiner

LEARNING FROM DELAYED OUTCOMES USING NEURAL NETWORKS

CROSS-REFERENCE TO RELATED APPLICATION

This application claims priority to U.S. Provisional Application No. 62/641,206, filed on Mar. 9, 2018. The disclosure of the prior application is considered part of and is incorporated by reference in the disclosure of this application.

BACKGROUND

This specification relates to a neural network system for learning from delayed outcomes.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that generates data items, for example predicted outcomes based on an input observation.

A first aspect of the present disclosure provides a neural network system for generating, based on an input observation, an output label distribution for a final time, the system comprising: a first neural network having an input for receiving an input observation, and having an output for determining, based on the input observation, a distribution for an intermediate indicator for a first time earlier than the final time; a second neural network having an input for receiving an input value of the intermediate indicator, and configured to determine the output label distribution for the final time based on the input value of the intermediate indicator, and having an output to provide the output label distribution.

A neural network may be trained using training data that consists of a set of training examples. In supervised learning, each example is a pair consisting of an input and an output label. For example, in training a neural network intended for use with an autonomous vehicle an input might be, or might be derived from, an image of a road, and the corresponding label might indicate whether or not the image shows another vehicle. As another example, in training a neural network intended to provide an initial review of medical images, such as X-ray images or scan image of a patient, to determine whether the patient should undergo further tests, an input would be, or would be derived from, a medical image, and the corresponding output label might indicate whether or not the patient shown in the image developed a particular medical condition. However, while this approach can work well, it can be difficult to apply in situations where the outcome corresponding to a particular input is not known for some time after the input. In the above example it may not be known for some time, possibly not for some years, whether a patient shown in a medical image did develop a particular medical condition—and the image cannot be included in training data until the outcome (i.e., whether or not the patient shown in the image did develop the particular medical condition that the neural network is being trained for) is known.

Aspects of the described system address this problem by assuming that the probability distribution of an outcome for a given input observation can be factorised into two distributions, one of which predicts an intermediate "feedback" indicator based on the input observation, and the other of which predicts the final outcome based on an observation of the intermediate feedback indicator. Each prediction may be carried out by a suitably trained neural network. The intermediate indicator provides some information about the probable final outcome. That is, the intermediate indicator is an event that is observable before the final outcome, i.e., that occurs or can first be observed before the final outcome could occur or first be observable, and that provides information about the final outcome that is not available when the observation is first received.

In general terms, an input "observation" comprises data that characterizes a state of an environment with which the neural network system is interacting. The environment may be a real-world environment, or it may be a simulated environment.

For example, the driver of an electric vehicle may wish to know whether the charge in their vehicle's battery at the start of a journey of 100 miles will be sufficient to complete the journey. An intermediate indicator may be the state of the vehicle (such as the charge remaining in the battery) after, say, 5 miles (with the input observation being the state of the electric vehicle (such as the initial charge in the battery) at the start of the journey)—the amount of charge remaining after 5 miles provides some information as to whether the charge in the vehicle's battery is likely to be sufficient to complete the journey.

Consider an example in which images of an item of machinery are acquired regularly, and are used to determine when a component is likely to require replacement or maintenance. According to the present disclosure, a second set of images acquired a short time after the first set may be used to provide an intermediate indicator, for example by providing feedback on whether or not a defect in a component is propagating through the component to an extent that will require the component to be replaced within the next three months. The time required to provide a set of labelled training data for training a neural network to predict the intermediate feedback indicator based on the initial observation is little more than the time delay between acquiring the first and second sets of images which may for example be only a few days—whereas conventionally it would be necessary to wait three months before an image could be labelled with its outcome.

As another example, an online marketplace may recommend items to a customer for purchase. One factor used to rank recommendations may be consumer engagement with purchased products. For example, an online book seller may want to maximize the sale of e-books that customers finish reading (on the theory that customers who engage with purchased content are likely to return to the store for more high-quality recommendations), an online video subscription service may want to maximize the number of videos that a customer watches completely, or an online gaming store may want to maximise the number of games that are played for at least two hours. While machine learning techniques can be used to provide recommendations, in these situations the outcome (e.g., whether a user finishes an e-book) is only revealed significantly after the time of conversion (e.g., when the user purchased the e-book). In the example of an online marketplace for e-books, an engagement event may be defined as whether or not a customer finishes a purchased e-book within the next 90 days—if the customer purchases an e-book, the transaction is logged but whether or not a successful engagement will occur is unknown without waiting 90 days to see whether the customer finished the book. This time delay means that predicted engagement for new products may be inaccurate for long periods of time. The present disclosure may be used in such cases. For example, one day after a purchase of an e-book it is possible to define intermediate outcomes based on the furthest node reached in the e-book in the 24 hours after purchase. It has been realised that these intermediate outcomes provide some information about the eventual outcome. For example, a few days after a customer has purchased an e-book, we may not know whether they will finish the book. However, we might observe that they have read more than half of the book, which greatly increases the chances that they will finish it. By taking this intermediate observation into account, we can improve our predictive model.

The neural network can be configured to receive any kind of digital data input and to generate any kind of score, classification, or regression output based on the input. For example, if the inputs to the neural network are images or features that have been extracted from images, the output generated by the neural network for a given image may be scores for each of a set of object categories, with each score representing an estimated likelihood that the image contains an image of an object belonging to the category (such as, if the images are medical images of a patient, whether the patient shown in an image developed a particular medical condition).

The output of the first neural network may be is configured to apply a softmax transform to the distribution for the intermediate indicator.

The input of the second neural network may be configured to receive the input value of the intermediate indicator as a one-hot encoded input value.

The neural network system may further comprises a third neural network system having at least one input for receiving one or more of, and optionally all the input observation, the input value of the intermediate indicator and the output label distribution for the final time, and having an output for determining a correction to the output label distribution for the second time; and the system may be configured to generate a corrected output label distribution for the final time based on the determined output label distribution for the final time and the determined correction.

The at least one input of the second neural network may be configured to receive the input value of the intermediate indicator as a one-hot encoded input value.

A second aspect of the present disclosure provides a method of training a neural network of the first aspect, the method comprising: providing a first set of training data to the first neural network, the first set of training data comprising input observations each labelled with a respective value for the intermediate indicator; training the first neural network using the first set of training data; providing a second set of training data to the second neural network, the second set of training data comprising values of the intermediate indicator each labelled with a respective output label; and training the second neural network using the second set of training data.

This aspect may comprise: training the first neural network by gradient descent using the first set of training data; and training the second neural network by gradient descent using the second set of training data. It may comprise stopping the gradient descent at the input to the second neural network.

The training by gradient descent may comprise a backpropagation process. For example the difference between a value of the intermediate indicator output by the first neural network for a particular input observation and the labelled value of the intermediate indicator corresponding to that input observation constitutes an "error", and can be used in training the first neural network by backpropagation.

A third aspect of the present disclosure provides an image analysis system comprising a neural network system of the first aspect.

An image analysis system of this aspect may, by way of example but without limitation be: a system for analysis of a medical image to determine whether the person or animal that is the subject of the image should be referred for further tests relating to a possible medical condition or to determine whether the person or animal that is the subject of the image is suffering from a particular medical condition; or a system for analysis of an image of a component to determine whether the component requires replacement diagnosis.

The disclosure is not however limited to the input observation being an image or derived from an image. As a further example, another application of the disclosure is to predict the consumption of an energy source, such as electricity, at a future time based on current demand, to allow the energy providers to be able to ensure that sufficient resources will be available to meet the expected demand but without providing large amounts of unused capacity. For example, it has been shown that it is possible for trained neural networks to predict the output of a wind turbine array 36 hours ahead of actual generation with a reasonable degree of accuracy. This makes it possible to schedule the wind turbine array to deliver a set amount of electricity at a set time, thereby reducing reliance on non-renewable sources of electricity.

In some implementations the neural network system may receive sensor and/or control data as an input, for example for sensing and/or controlling a mechanical agent such as a robot or autonomous or semi-autonomous vehicle and may predict a behaviour or response of the mechanical agent. In these implementations, the observations may include, for example, one or more of images, object position data, and sensor data to capture observations as the agent interacts with the environment, for example sensor data from an image, distance, or position sensor or from an actuator. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. For example in the case of a robot the observations may include data characterizing the current state of the robot, e.g., one or more of: joint position, joint velocity, joint force, torque or acceleration, and global or relative pose of a part of the robot such as an arm and/or of an item held by the robot. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In some instances the behaviour or response may be delayed, for example because of an inherent inertia of the agent, and the system may employ an intermediate indicator to predict a response of the agent. In a related manner a sensor or other input/control signal may be delayed and the mechanical agent controlled based on the intermediate indicator. For example for a vehicle mapping or other data may be temporarily unavailable due to unavailability of a remote wireless connection. In another example part condition data such as battery or motor condition data may be available in an intermediate form before a final outcome such as battery depletion or motor failure. The system may be employed to improve prediction of the final outcome. Similar approaches may be employed to make improved predictions regarding any industrial/manufacturing process control application. In a still further example data characterizing the location or state of a system, which may be a mechanical, electromechanical, or other system, may be employed to determine an intermediate indicator relating to whether or not parameters of the system are within a target or safe operating bound, for example relating to temperature, power consumption, the location or configuration of a physical entity and so forth. The final outcome may comprise a determination of whether the system is within the bound. In this way some implementations of the system may be employed to provide an early prediction of whether the system is likely to remain within a safe or target operating condition bound.

In still other implementations the system may be employed to provide personalized recommendations for a user. For example the input observations may comprise features characterizing a context for the recommendation such as features characterizing previous actions taken by the user in relation to one or more content items. The intermediate indicator(s) may comprise data characterizing an intermediate response of the user to the one or more content items, for example a response at an intermediate time between the user first accessing the content item and a time of final consumption of the content item. An output neural network system may then comprise a score for each of a set of one or more other content items, with each score representing an estimated likelihood that the user will respond favorably to being recommended the content item. In a related manner the input observations may comprise impressions for one or more particular advertisements, the intermediate indicator(s) may comprise data characterizing an intermediate response of the user to the advertisement(s), and an output neural network system may comprise a score, for example representing an estimated likelihood that the particular advertisement will be clicked on, or an estimated likelihood that the user will respond at some later time with a purchase decision to purchase goods or services advertised by one or more of the particular or other advertisements.

In some implementations the environment is a simulated environment. For example the simulated environment may be a simulation of a robot or vehicle. Generally in the case of a simulated environment the observations may include simulated versions of one or more of the previously described observations or types of observations and the actions may include simulated versions of one or more of the previously described actions or types of actions.

A fourth aspect of the present disclosure provides one or more computer-readable storage media storing instructions that when executed by one or more computers cause the one or more computers to implement a system of the first aspect.

The subject matter described in this specification can be implemented in particular embodiments so as to realize one or more of the following advantages.

As the intermediate feedback indicator is known much earlier than the final outcome, a set of labelled training data for training a neural network to predict the intermediate "feedback" indicator based on the input observation can be established in a much shorter time than can a set of training data for training a neural network to predict the final output based on the input observation. Further, the prediction of the final outcome based on an observation of the intermediate feedback indicator is independent of the initial input observation, and a set of labelled training data for training a neural network to predict the final outcome based on the intermediate feedback indicator can also be established in a much shorter time than can a set of training data for training a neural network to predict the final output based on the input observation. Reducing the time needed to establish the training data reduces the resources, such as computing resources and/or network resources, needed to establish the training data. The described systems may also make fewer mistakes than existing systems and may be less sensitive to delays in feedback on the final outcome.

Moreover, by reducing the time required to obtain labelled training data, in a given time period a larger set of training data can be established, and this will increase the accuracy with which the neural network can be trained. This may make it possible for a simpler neural network (for example with fewer hidden layers) to be used, and this may result in a reduction in the computing resources required to implement the neural network. In a complementary manner data may need to be stored for a shorter period, and thus overall less memory storage may be required.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
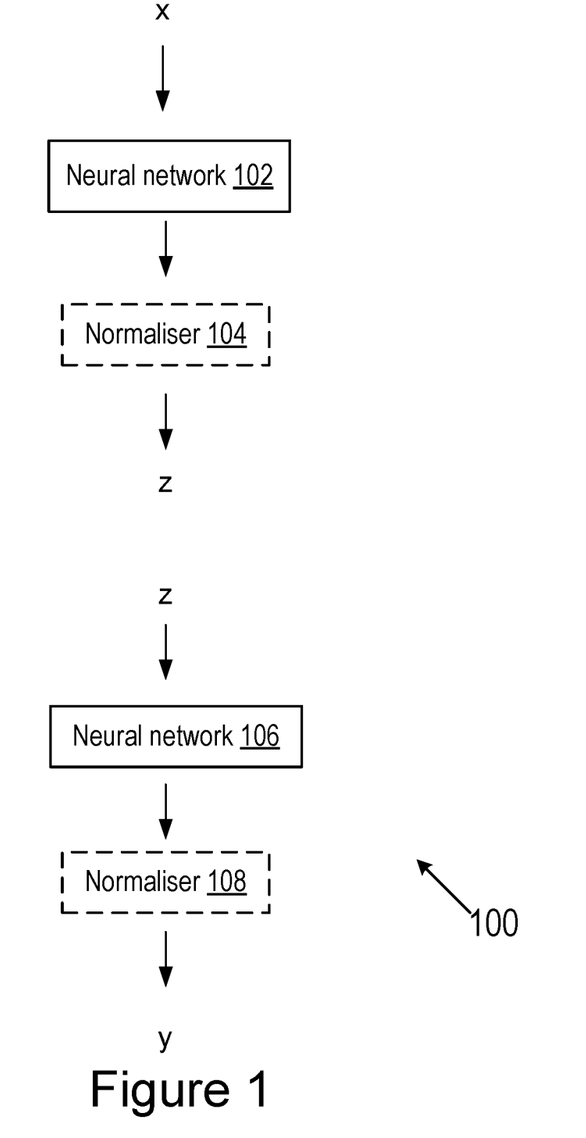
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 includes multiple neural networks 102, 104. Each neural network contains multiple neural network layers that are arranged in a sequence from a lowest layer in the sequence to a highest layer in the sequence. The neural network generates neural network outputs from neural network inputs by processing the neural network inputs through each of the layers in the sequence.

The neural network system 100 can be configured to receive any kind of digital data input and to generate any kind of score or classification output based on the input.

For example, if the inputs to the neural network system 100 are images or features that have been extracted from images, the output generated by the neural network system 100 for a given image may be scores for each of a set of object categories, with each score representing an estimated likelihood that the image contains an image of an object belonging to the category. Alternatively, if the inputs to the neural network system 100 are medical images of a person or animal, or features that have been extracted from medical images of a person or animal, the output generated by the neural network system 100 for a given image may be scores for each of a set of categories representing an estimated likelihood that the person or animal that is the subject of the image is suffering from, or may develop, a particular medical condition.

As another example, if the inputs to the neural network system 100 are Internet resources (e.g., web pages), documents, or portions of documents or features extracted from Internet resources, documents, or portions of documents, the output generated by the neural network system 100 for a given Internet resource, document, or portion of a document may be a score for each of a set of topics, with each score representing an estimated likelihood that the Internet resource, document, or document portion is about the topic.

As another example, if the inputs to the neural network system 100 are features of an impression context for a particular advertisement, the output generated by the neural network system 100 may be a score that represents an estimated likelihood that the particular advertisement will be clicked on.

As another example, if the inputs to the neural network system 100 are features of a personalized recommendation for a user, e.g., features characterizing the context for the recommendation, e.g., features characterizing previous actions taken by the user, the output generated by the neural network system 100 may be a score for each of a set of content items, with each score representing an estimated likelihood that the user will respond favorably to being recommended the content item.

As another example, the neural network system 100 can be part of a reinforcement learning system and can generate outputs used for selecting actions to be performed by an agent interacting with an environment. In broad terms a reinforcement learning system is a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation. Optionally the observation at a time step may include data from a previous time step e.g., the action performed at the previous time step, the reward received at the previous time step, and so forth.

In particular, each of the layers of the neural network is configured to receive an input and generate an output from the input and the neural network layers collectively process neural network inputs received by the neural network system 100 to generate a respective neural network output for each received neural network input. Some or all of the neural network layers in the sequence generate outputs from inputs in accordance with current values of a set of parameters for the neural network layer. For example, some layers may multiply the received input by a matrix of current parameter values as part of generating an output from the received input.

As noted above, in many cases it is desirable, given an input (or "observation"), to predict an outcome, or predict probabilities associated with each of multiple possible outcomes, for that starting event. Conventionally this is done using a neural network that has been trained using a set of training data comprising input observations each labelled with a respective value for the outcome. However, in situations where the outcome may not be known until a considerable time after the observation, such as if the observation is a medical image of a person or animal, it can be difficult to acquire suitable training data. Aspects of the present disclosure accordingly make use of "intermediate feedback"—that is, feedback from "intermediate outcomes" obtained a time when the eventual outcome is not yet known. It has been realised that such intermediate outcomes provide information about the eventual outcome.

According to one aspect of the disclosure that makes use of intermediate feedback it is assumed is that the distribution of final outcomes can be factorised into two models: (1) one that predicts the distribution over intermediate outcomes from observations, and (2) one that predicts the distribution of final outcomes from intermediate feedback. As described in more detail below, the neural network system 100 of FIG. 1 has two neural networks learning these two models separately.

More formally, if x represents an observation, y represents a final outcome, and z represents an intermediate outcome, the assumption that the distribution of final outcomes can be factored into two models implies that the probability of y is:

$$f^*(y|x) = \Sigma g(y|z) h(z|x) \quad (1)$$

In equation (1), g and h represent two conditional probability distributions. Since g does not depend on an observation it can be estimated independent of actual observations. On the other hand, h does depend on an observation, but the intermediate observation is available much sooner than the final observation. As a result, h can be obtained or updated more quickly than trying to estimate f directly from final observation.

Accordingly, in the neural network system of FIG. 1, the first neural network 102 receives an input observation x and output a predicted distribution over intermediate outcomes z. The output of the first neural network 102 may optionally be normalised, for example by a "softmax" normaliser 104 that maps the output of the first neural network 102 to a probability distribution over predicted output classes. That is, in the output from the neural network, vector components could be negative or greater than one, and/or the components might not sum to 1; but, in the output from the softmax normaliser 104, each component will be in the interval, and the components will add up to 1, so that they can be interpreted as probabilities. Furthermore, the larger input components will correspond to larger probabilities.

Further, in the neural network system of FIG. 1, the second neural network 106 receives an input intermediate outcome z and outputs a predicted distribution over final outcomes y. For example, the system can generate the input value of the intermediate outcome by sampling from the predicted distribution over intermediate outcome values or by selecting the intermediate outcome with the highest score in the predicted distribution. The output of the second neural network 106 may optionally be normalised, for example by a "softmax" normaliser 108 that maps the output of the first neural network 102 to a probability distribution over predicted output classes.

Once the system has determined the distribution over possible labels for the input observation at the final time, the system can provide an output derived from the distribution, e.g., for presentation to a user of a user device or for storage in data storage. For example, the provided output can be the distribution or the corrected distribution or can be data identifying one or more highest-scoring labels from the distribution or from the corrected distribution.

Figure 4A:
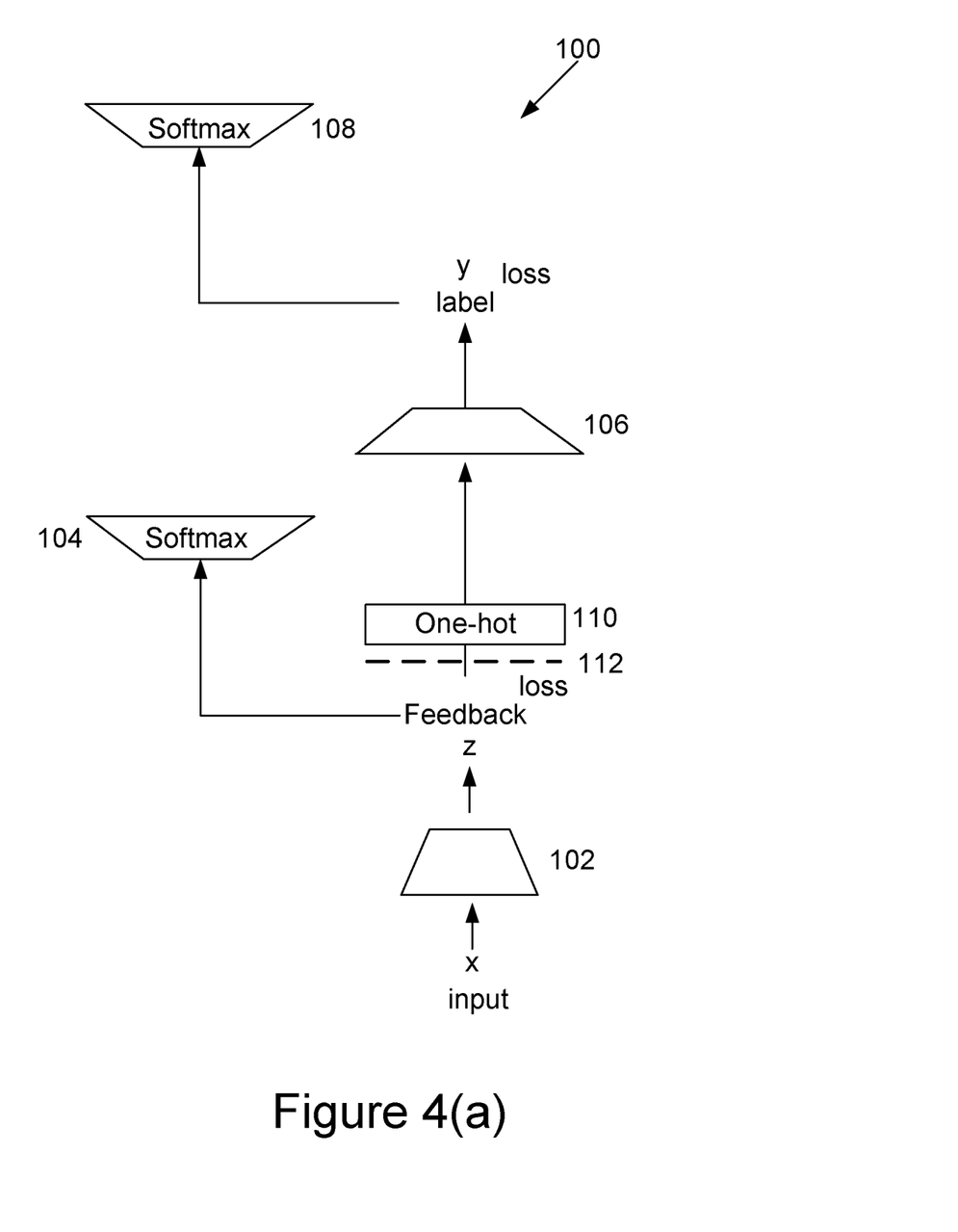
FIG. 4(a) shows a more detailed implementation of the neural network system of FIG. 1.

FIG. 4(a) shows a more detailed implementation of the neural network system of FIG. 1. As described, the first neural network 102 receives as input an input observation x and output a predicted distribution over intermediate outcomes z. The second neural network 106 receives an input intermediate outcome z and outputs a predicted distribution over final outcomes y. The neural network system optionally has an encoder 110, for example a one-hot encoder, for encoding the input to the second neural network 106. (As known, a "one-hot" input comprises a group of bits in which exactly one bit is "high" (has a value of 1) and all other bits are "low" (have a value of 0). Reference 112 denotes a stop gradient used in the training process, as described further below.

Figure 2:
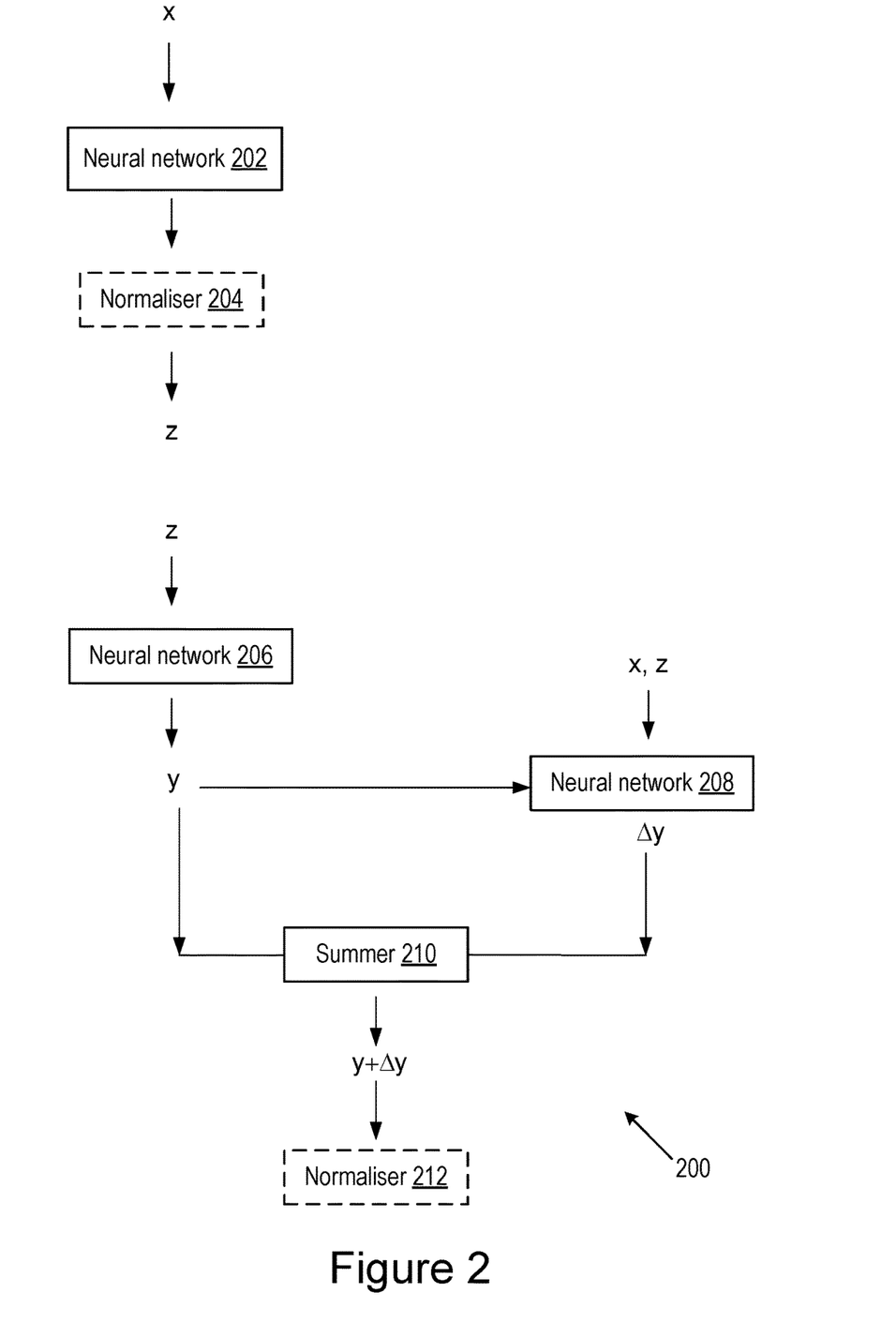
FIG. 2 shows another example neural network system.

FIG. 2 shows a further example neural network system 200. The neural network system 200 is an example of a system implemented as computer programs on one or more computers in one or more locations, in which the systems, components, and techniques described below can be implemented.

In the neural network system of FIG. 2, the first neural network 202 receives an input observation x and outputs a predicted distribution over intermediate outcomes z. The output of the first neural network 202 may optionally be normalised, for example by a "softmax" normaliser 204. The second neural network 206 receives an input intermediate outcome z and output a predicted distribution over final outcomes y. The first neural network 202, the normaliser 204 and the second neural network 206 correspond to the first neural network 102, the normaliser 104 and the second neural network 106 respectively, and their description will not be repeated.

As explained above the neural network system 100 of FIG. 1 is based on the assumption is that the distribution of final outcomes can be represented as the product of two conditional probability distributions. The neural network system 200 of FIG. 2 may be used in cases where this assumption does not hold exactly, or does not hold to within a desired degree of accuracy. The neural network system 200 of FIG. 2 further includes a third neural network 208 that generates a correction $\Delta y$ that may be added by adder 210 to the output of the second neural network to correct the output of the second neural network against errors in that arise from the failure of this assumption. The third neural network 208 receives as input one or more of, and optionally all of, the input observation x, the input intermediate outcome z and the predicted distribution over final outcomes y as output by the second neural network 206. The corrected output from the adder 210 may optionally be normalised by a normaliser 212, for example a softmax normaliser.

Figure 4B:
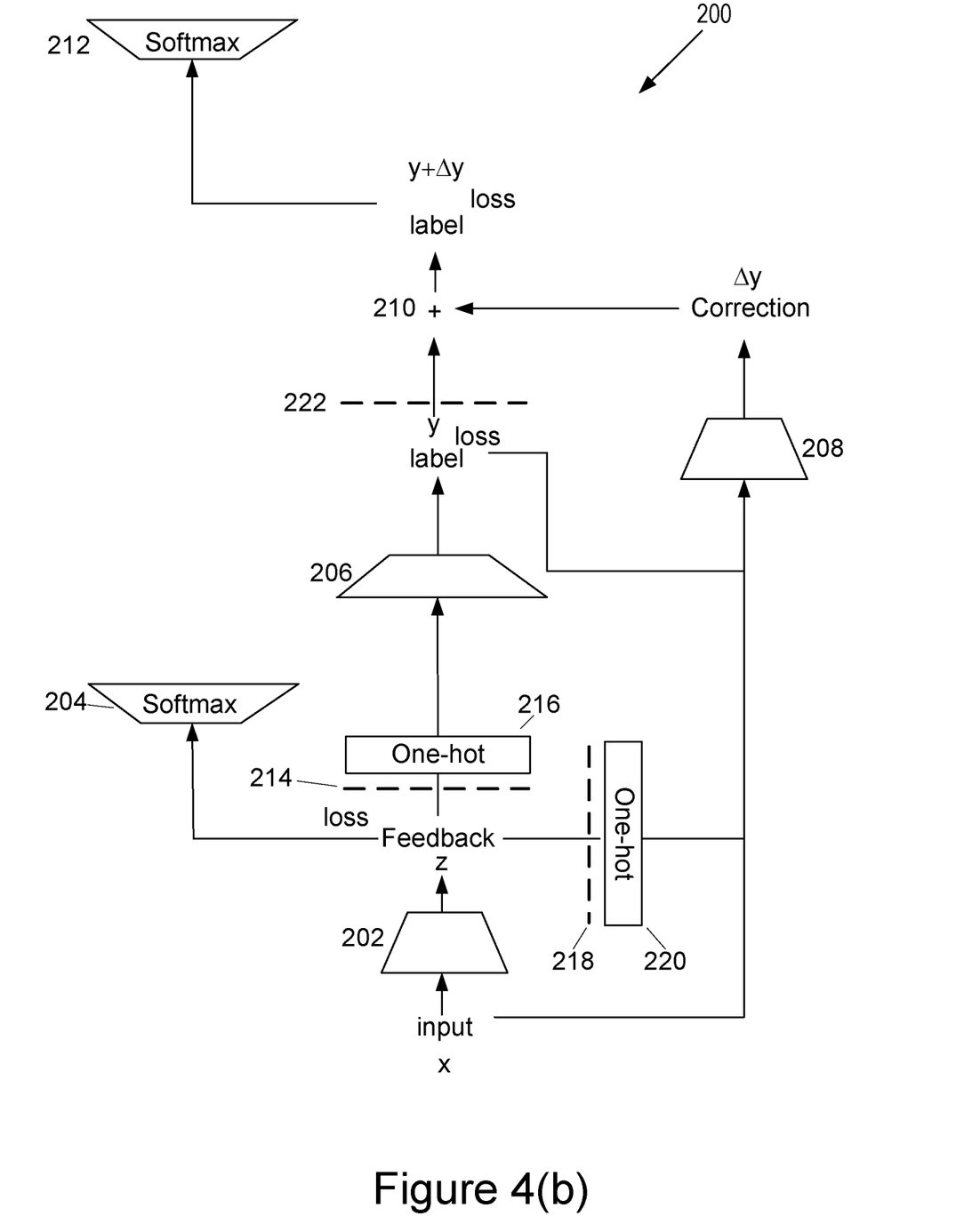
FIG. 4(b) shows a more detailed implementation of the neural network system of FIG. 2.

FIG. 4(b) shows a more detailed implementation of the neural network system of FIG. 2. As described, the first neural network 202 receives as input an input observation x and output a predicted distribution over intermediate outcomes z. The second neural network 206 receives an input intermediate outcome z and output a predicted distribution over final outcomes y. The neural network system optionally has an encoder 216, for example a one-hot encoder, for encoding the input to the second neural network 106. Reference 214 denotes a stop gradient used in the training process.

The third neural network 208 receives as input one or more of, and optionally all of, the input observation x, the input intermediate outcome z and the predicted distribution over final outcomes y as output by the second neural network 206. The neural network system optionally has an encoder 220 for example a one-hot encoder, for encoding the intermediate outcome z input to the third neural network 208. References 218 and 220 denote stop gradients used in the training process.

Figure 3:
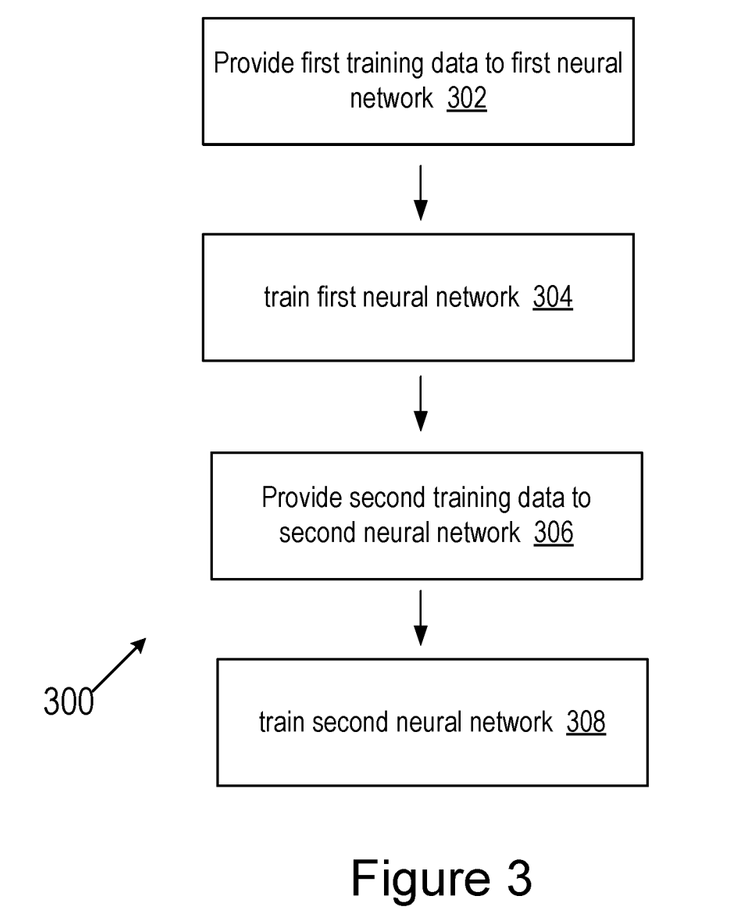
FIG. 3 is a flow diagram of an example process for processing an input during training of the neural network system.

FIG. 3 is a flow diagram of an example process 300 for training a neural network system 100 of FIG. 1 on a batch of training examples. For convenience, the process 300 will be described as being performed by a system of one or more computers located in one or more locations.

At block 302 of FIG. 3, first training data are provided to the first neural network 102 of FIG. 1. The first training data consists of a set of inputs (initial observations) for which the intermediate outcome distribution that should be generated by the system is known, in order to train 304 the first neural network by determining trained values for the parameters of the layers of the first neural network. The processes 302 and 304 are iteratively performed on inputs selected from a set of training data as part of a conventional machine learning training technique to train the layers.

The machine learning training technique to train the first neural network may for example by stochastic gradient descent with backpropagation, where the system selects subsets of the training data, referred to as "batches", the system generates predicted intermediate outcome distribution corresponding to the initial observations in the batch, and the system adjusts the values of the parameters of the layers of the first neural network to improve the performance of the system according to a performance measure by backpropagation.

At block 306 of FIG. 3, second training data are provided to the second neural network 106 of FIG. 1. The second training data consists of a set of inputs (intermediate observations) for which the final outcome distribution that should be generated by the system is known, in order to train 308 the second neural network by determining trained values for the parameters of the layers of the second neural network. The processes 306 and 308 are iteratively performed on inputs selected from a set of training data as part of a conventional machine learning training technique to train the layers.

The first training data and the second training data may be separate data sets to one another. That is the first training data may have been collected by labeling a set of initial observations with their respective intermediate outcomes, and the second training data may have been collected by labeling a set of intermediate observations with their respective final outcomes. Alternatively, the first training data and the second training data may be maintained in a common data structure, collected by labelling a set of initial observations with their respective intermediate outcomes and with their respective final outcomes.

The machine learning training technique to train the second neural network may for example by stochastic gradient descent with backpropagation, where the system selects subsets of the training data, referred to as "batches", the system generates predicted final outcome distributions corresponding to the intermediate observations in the batch, and the system adjusts the values of the parameters of the layers of the second neural network to improve the performance of the system according to a performance measure by backpropagation. The gradient descent may be stopped at the input to the second neural network, for example by a stop gradient 112 as shown in FIG. 4(*a*).

Although FIG. 3 shows blocks 306 and 308 as following blocks 302, 304, the method of FIG. 3 does not require this. Blocks 306 and 308 may for example alternatively be performed before, or concurrent with, blocks 302 and 304.

To train a neural network system 200 as shown in FIG. 2, having a third neural network 208 for estimating a correction factor to apply to the output of the second neural network 206, the first neural network 202 and the second neural network 206 may be trained as described above for the first neural network 102 and the second neural network 106 of the neural network system 100 of FIG. 1. The third neural network may then be trained by providing third training data that consists of a set of inputs (initial observations) for which the final outcome distribution that should be generated by the system is known. The initial observation is provided to the first neural network 202, and is also provided to the third neural network 208. The third neural network also receives as an input one or more of, and optionally both of, the estimated intermediate outcome distribution provided by the first neural network 202 and the estimated final outcome distribution provided by the second neural network 206, to train the third neural network by determining trained values for the parameters of the layers of the third neural network to generate a correction that, when combined with (for example added to or subtracted from) the output of the second neural network 208 minimizes the difference between the corrected output (y+Δy in FIG. 2 or FIG. 4(*b*)) predicted for an initial observation and the true output for that observation.

The machine learning training technique to train the third neural network may for example be stochastic gradient descent with backpropagation. The gradient descent may be stopped at the input to the second neural network, for example by a stop gradient 214 as shown in FIG. 4(*b*). The gradient descent may be stopped at the input to the third neural network, for example by a stop gradient 214 as shown in FIG. 4(*b*). The gradient descent may be stopped at the input to the summer 210, for example by a stop gradient 222 as shown in FIG. 4(*b*).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving an input observation at a first time;
   generating, from the input observation, an output label distribution over possible labels for the input observation at a final time, the generating comprising:
      processing the input observation using a first neural network configured to process the input observation to generate a distribution over possible values for an intermediate indicator, wherein the intermediate indicator is a second, different observation that is first observable at a second time that is later than the first time and earlier than the final time;
      generating, from the distribution over possible values for the intermediate indicator at the second time, a predicted input value for the intermediate indicator; and
      processing the predicted input value for the intermediate indicator independently of the input observation using a second neural network configured to process the predicted input value for the intermediate indicator to determine the output label distribution over possible values for the input observation at the final time, and providing an output derived from the output label distribution.

2. The method of claim 1 wherein the first neural network is configured to apply a softmax transform to the distribution for the intermediate indicator.

3. The method of claim 1 wherein the second neural network is configured to receive the predicted input value of the intermediate indicator as a one-hot encoded input value.

4. The method of claim 1, further comprising:
processing one or more of the input observation, the predicted input value of the intermediate indicator using a third neural network to generate a correction to the output label distribution for the final time.

5. The method of claim 4, further comprising:
generating a corrected output label distribution for the final time based on the determined output label distribution for the final time and the determined correction.

6. The method of claim 5, wherein the provided output is the corrected output label distribution or data identifying one or more highest-scoring labels according to the corrected output label distribution.

7. The method of claim 4, wherein the third neural network is configured to receive the predicted input value of the intermediate indicator as a one-hot encoded input value.

8. The method of claim 1, wherein generating, from the distribution over possible values for the intermediate indicator at the second time, the predicted input value for the intermediate indicator comprises:
sampling the predicted input value from the distribution over possible values or selecting a possible value having the highest score in the distribution.

9. A system comprising one or more computers and one or more storage devices storing instructions that when executed by one or more computers cause the one or more computers to perform operations comprising:
receiving an input observation at a first time;
generating, from the input observation, an output label distribution over possible labels for the input observation at a final time, the generating comprising:
processing the input observation using a first neural network configured to process the input observation to generate a distribution over possible values for an intermediate indicator, wherein the intermediate indicator is a second, different observation that is first observable at a second time that is later than the first time and earlier than the final time;
generating, from the distribution over possible values for the intermediate indicator at the second time, a predicted input value for the intermediate indicator; and
processing the predicted input value for the intermediate indicator independently of the input observation using a second neural network configured to process the predicted input value for the intermediate indicator to determine the output label distribution over possible values for the input observation at the final time; and
providing an output derived from the output label distribution.

10. The system of claim 9 wherein the first neural network is configured to apply a softmax transform to the distribution for the intermediate indicator.

11. The system of claim 9 wherein the second neural network is configured to receive the predicted input value of the intermediate indicator as a one-hot encoded input value.

12. The system of claim 9, the operations further comprising:
processing one or more of the input observation, the predicted input value of the intermediate indicator using a third neural network to generate a correction to the output label distribution for the final time.

13. The system of claim 12, the operations further comprising:
generating a corrected output label distribution for the final time based on the determined output label distribution for the final time and the determined correction.

14. The system of claim 13, wherein the provided output is the corrected output label distribution or data identifying one or more highest-scoring labels according to the corrected output label distribution.

15. The system of claim 12, wherein the third neural network is configured to receive the predicted input value of the intermediate indicator as a one-hot encoded input value.

16. The system of claim 9, wherein generating, from the distribution over possible values for the intermediate indicator at the second time, the predicted input value for the intermediate indicator comprises:
sampling the predicted input value from the distribution over possible values or selecting a possible value having the highest score in the distribution.

17. One or more non-transitory computer-readable storage media storing instructions that when executed by one or more computers cause the one or more computers to perform operations comprising:
receiving an input observation at a first time;
generating, from the input observation, an output label distribution over possible labels for the input observation at a final time, the generating comprising:
processing the input observation using a first neural network configured to process the input observation to generate a distribution over possible values for an intermediate indicator, wherein the intermediate indicator is a second, different observation that is first observable at a second time that is later than the first time and earlier than the final time;
generating, from the distribution over possible values for the intermediate indicator at the second time, a predicted input value for the intermediate indicator; and
processing the predicted input value for the intermediate indicator independently of the input observation using a second neural network configured to process the predicted input value for the intermediate indicator to determine the output label distribution over possible values for the input observation at the final time; and
providing an output derived from the output label distribution.

18. The computer-readable storage media of claim 17 wherein the second neural network is configured to receive the predicted input value of the intermediate indicator as a one-hot encoded input value.

19. The computer-readable storage media of claim 17, the operations further comprising:
processing one or more of the input observation, the predicted input value of the intermediate indicator using a third neural network to generate a correction to the output label distribution for the final time.

20. The computer-readable storage media of claim 19, the operations further comprising:

generating a corrected output label distribution for the final time based on the determined output label distribution for the final time and the determined correction.

* * * * *